United States Patent [19]
Martin et al.

[11] Patent Number: 6,035,334
[45] Date of Patent: Mar. 7, 2000

[54] SYSTEM FOR COMMUNICATING STATE INFORMATION RELATING TO USER PREVIOUS INTERACTIONS WITH OTHER INTERNET WEB SITES DURING AN INTERNET SESSION

[75] Inventors: Christopher W. Martin, Natick; Mauricio Korbman, Newton; Kenneth Green, Lexington, all of Mass.

[73] Assignee: Tibersoft Corporation, Needham, Mass.

[21] Appl. No.: 08/926,964

[22] Filed: Sep. 10, 1997

[51] Int. Cl.⁷ .................................................. G06F 13/00
[52] U.S. Cl. .......................... 709/228; 709/227; 709/224
[58] Field of Search .......................... 707/9, 10; 709/228, 709/227, 224

[56] References Cited

U.S. PATENT DOCUMENTS

| | | | |
|---|---|---|---|
| 5,625,781 | 4/1997 | Cline et al. ............................. | 395/335 |
| 5,774,670 | 6/1998 | Montulli ............................. | 395/200.57 |
| 5,796,952 | 8/1998 | Davis et al. ....................... | 395/200.54 |
| 5,796,953 | 8/1998 | Zey ................................... | 395/200.57 |
| 5,813,007 | 9/1998 | Nielsen ..................................... | 707/10 |
| 5,848,233 | 12/1998 | Radia et al. ....................... | 395/187.01 |
| 5,848,412 | 12/1998 | Rowland et al. .......................... | 707/9 |

*Primary Examiner*—Le Hien Luu
*Attorney, Agent, or Firm*—Pandiscio & Pandiscio

[57] ABSTRACT

An Internet system comprising a user computer connected to the Internet; a group of related, information-containing Internet sites; and means for permitting the user computer to sequentially interact with selected ones of the group of Internet sites such that each of the selected ones of the Internet sites is provided with user-specific information regarding the user computer's prior interactions with Internet sites contained within the group during any discrete Internet session.

7 Claims, 15 Drawing Sheets

Standard Packet Architecture

Header Contents
* IP Address
* Browser Type
* Date & Packet Size

Body Contents
* Destination
* Return coordinates

FIG. 2

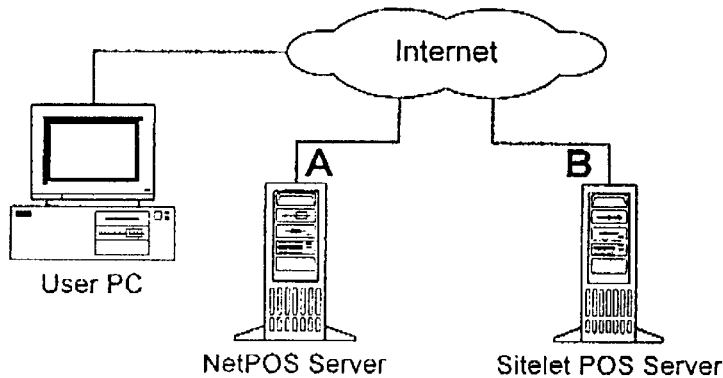

Applicational Context

Sample Exchange between NetPOS and Sitelet POS Applications

| Step | Action | Result |
|---|---|---|
| 1 | User logs into NetPOS Server (A) and establishes state | User is identified by the A, a session file is started and state is established |
| 2 | User executes query to A for product information | A returns collection of production information in standard Internet packet format |
| 3 | User requests more detailed product information to A | User is seamlessly connected to B as packet data sent to User PC in Step 2 is used to carry request and state data. |
| 5 | User issues request to add item to order after viewing detailed information | User seamlessly reconnected to A using packet data sent to User PC in Step 3. State and additional state data (for enhanced state) is carried. |

FIG. 3

Modified Packet Architecture

Header Contents
* IP Address
* Browser Type
* Date & Packet Size

Body Contents
* Identity
* Destination
* Return coordinates
* State
* Enhanced state

FIG. 4

SiteletCall.txt
```
<FORM METHOD=POST ACTION="http://ttt.food-online.com/scripts/runisa.dll?vendor:vendorkiosk:1
10012:2=000-16000-68790=gtgmedford=%"
TARGET="MainFrame">

<INPUT TYPE=HIDDEN NAME="DefaultPriHtm" VALUE="yellow.htm">
<INPUT TYPE=HIDDEN NAME="BgGifPrimary" VALUE="">
<INPUT TYPE=HIDDEN NAME="BgPrimary" VALUE="#FFFFCC">
<INPUT TYPE=HIDDEN NAME="TxtPrimary" VALUE="#000000">
<INPUT TYPE=HIDDEN NAME="LnkPrimary" VALUE="#0000FF">
<INPUT TYPE=HIDDEN NAME="TxtPrimaryTitle" VALUE="#008000">
<INPUT TYPE=HIDDEN NAME="HeaderBgColor" VALUE="#C0C0C0">
<INPUT TYPE=HIDDEN NAME="HeaderTxtColor" VALUE="#008000">
<INPUT TYPE=HIDDEN NAME="HintText" VALUE="RED">
<INPUT TYPE=HIDDEN NAME="Required" VALUE="RED">

<INPUT TYPE=HIDDEN NAME="DefaultNavHtm" VALUE="green.htm">
<INPUT TYPE=HIDDEN NAME="BgGifNav" VALUE="">
<INPUT TYPE=HIDDEN NAME="BgNav" VALUE="#008000">

<INPUT TYPE=HIDDEN NAME="usercity" VALUE="Needham">
<INPUT TYPE=HIDDEN NAME="userstate" VALUE="MA">
<INPUT TYPE=HIDDEN NAME="userzip" VALUE="02194">
<INPUT TYPE=HIDDEN NAME="StoreFullName" VALUE="Groceries To Go - Medford">
<INPUT TYPE=HIDDEN NAME="DivisionFullName" VALUE="Groceries To Go">
<INPUT TYPE=HIDDEN NAME="AccessMethod" VALUE="ItemList">

</FORM></BODY>
```

Page 1

SiteletCall.txt

```
<FORM METHOD=POST
ACTION="http://www.food-online.com/scripts/runisa.dll?Harvest:BackFromVendor:143195:FROMVE
NDOR=000-00
901-00005" TARGET="MainFrame">

<INPUT TYPE=HIDDEN NAME=dummy" VALUE="">

</FORM></BODY>
```

SYSTEM FOR COMMUNICATING STATE INFORMATION RELATING TO USER PREVIOUS INTERACTIONS WITH OTHER INTERNET WEB SITES DURING AN INTERNET SESSION

FIELD OF THE INVENTION

The present invention relates generally to the transfer of information via the Internet, and more particularly to the transfer of information via the World Wide Web (the "Web").

BACKGROUND OF THE INVENTION

In accordance with the previously-existing state of the art, a user can utilize the Internet to access Web sites hosted on remote computers (e.g., Site Server A, Site Server B, etc.). See FIG. 1.

In this situation, the user typically accesses a remote Web site using a standard electronic access packet. See FIG. 2. The standard access packet has an architecture which includes header contents and body contents. Header contents typically include information such as the target site's IP ("Internet Protocol") address, the user's browser type, the date and size of the packet, etc. Body contents typically includes destination information, return co-ordinates, etc.

At the destination site, additional user-specific information may be collected, e.g., the user's name, the user's postal code, the user's telephone number, the user's selections from various menu choices, etc. When the destination site communicates back with the user, this additional user-specific information may, if desired, be added to the body content of the access packet, so as to establish a "state" for the user, and this "state" can be maintained and used during the user's session with that destination site.

In accordance with the previously-existing state of the art, if and when the user thereafter moves from the first destination site to a new destination site, either by "clicking" on a hypertext link presented by the first destination site or by entering a new URL ("Universal Resource Locator") address (i.e., "http://www.xxxxxxxx.xxx") into the user's browser, the user logs onto the new site using the standard access packet, thus arriving at the new site "without state".

The architecture employed by the previously-existing state of the art can be advantageous in the sense that site access on the Web is simple and "egalitarian". However, it can also be limiting in the sense that the user must establish "state" at each new Web site as that site is accessed by the user.

Numerous situations exist where it could be advantageous to have "state" information carried from one Web site to another Web site.

By way of example but not limitation, it could be advantageous to have "state" information carried from one Web site to another Web site when accessing some Web commerce sites. More particularly, some Web commerce sites utilize a so-called "shopping basket" transaction engine, wherein the user shops from a "store list" of available products and selects the desired products for the user's "shopping basket". In many of these systems, the user may require more detailed information about a particular product before selecting that product for purchase. As a result, the system may be configured to permit the user to temporarily exit the store list setting to view specific product information before returning to the store list setting to resume product purchasing. In such a situation, it can be desirable to enable the user to select the product for purchase while in the product information setting, and to have this purchase selection retained upon the user's return to the store list setting. Furthermore, in some situations, it may be desirable to have the store list setting hosted by one Web site and specific product information settings hosted by one or more other Web sites, e.g., sites maintained by specific manufacturers. This is particularly true inasmuch as each individual manufacturer is generally the party most familiar with its own products. In this situation, it would be helpful for the user to establish "state" at the store list site and then to retain, and "enhance", that state as the user moves to and from various product information sites.

By way of further example but not limitation, it could be advantageous to have "state" information carried from one Web site to another Web site when accessing some Web education sites. More particularly, in such a Web education site, student registration information might be maintained at a first site, educational content might be maintained at a second site, and an interactive test system might be maintained at a third site. In this situation, it could be helpful for the user to establish "state" at the first registration site, go to the second educational content site and "enhance" that state, e.g., by reviewing educational material, and then go to the third interactive test site for testing and use the test results to further "enhance" the user's state, e.g., by taking a test and recording the results of that test.

By way of further example but not limitation, it could be advantageous to have "state" information carried from one Web site to another Web site when accessing some Web engineering sites. More particularly, in such a Web engineering site, basic information might be maintained at a primary site regarding the interactive design of a product, while component details might be maintained at one or more satellite sites. In this situation, it might be considered more efficient for the user to specify components at a satellite component site and let the information regarding the specified components travel back to the primary site as enhanced state information upon the user's return to the primary site.

OBJECTS OF THE INVENTION

Accordingly, a primary object of the present invention is to provide a system for communicating between a group of related Web sites which permits a user to sequentially interact with selected ones of the related Web sites in such a manner that each successively visited Web site is provided with user-specific information regarding that user's prior interaction with others of the related Web sites during an Internet session.

Another primary object of the present invention is to provide an improved method for communicating between a group of related Web sites.

SUMMARY OF THE INVENTION

These and other objects of the present invention are achieved through the provision and use of a novel system for communicating between a group of related Web sites, wherein the system permits a user to sequentially interact with selected ones of the related Web sites in such a manner that each successively visited Web site is provided with user-specific information regarding that user's prior interaction with others of the related Web sites during an Internet session.

More specifically, the system comprises a group of Web sites which include a base Web site and various related Web sites (or "sitelets") which contain information related to, and permissably expanding upon, the subject matter of the base Web site. The base Web site and the various Web sitelets are functionally interrelated such that during the course of a particular Web session, the user first accesses the base Web site in a conventional manner using the standard electronic Web access packet. Thereafter, as the user navigates among the base Web site and the various Web sitelets, the user's Web access packet may be continually modified so as to contain enhanced state information regarding the user's previous interactions with the base Web site and the various sitelets.

Even more specifically, the system is configured and programmed such that the user first accesses the base Web site in the conventional manner, i.e., with the standard Web access packet. Upon user interaction with the base Web site, additional state information is added to the body content portion of the user's standard Web access packet. When the user thereafter connects to a related Web sitelet, the state information contained in the modified Web access packet may be used by that sitelet to determine what additional information is to be provided to the user by that sitelet, and the format in which that information is to be provided. Thereafter, as the user interacts with that sitelet, the user's state information may be enhanced (i.e., additional information may be added to the body portion of the user's standard Internet access packet) such that, upon the user's navigation to another related Web sitelet or back to the base Web site, the enhanced Web access packet can contain a record of the user's activity and interactions with that Web sitelet. This enhanced state information may then be utilized by the next Web site which is accessed so as to format, configure and/or supplement the information displayed to the user at the new site being accessed.

The foregoing construction can be used to avoid duplicative user interaction with a plurality of Web sites, and to create an integrated Web session experience for the user, even though multiple Web sites—at possibly widely separated geographic locations and under the control of totally separate entities—form part of the group.

BRIEF DESCRIPTION OF THE DRAWINGS

These and other objects and features of the present invention will be more fully disclosed, and/or rendered obvious by, the following detailed description of the preferred embodiment of the invention, which is to be considered together with the accompanying drawings, wherein:

FIG. 2 is a schematic illustration showing the architecture of a conventional electronic Web access packet;

FIG. 3 is a schematic illustration showing the Internet system of the present invention;

FIG. 4 is a schematic illustration showing the architecture of a modified electronic Web access packet of the sort which may be used in accordance with the present invention;

FIGS. 7–9, 11–13 and 15 are illustrative views of computer screen images which might be displayed to a user during operation of the exemplary system depicted in FIG. 6;

FIG. 10 is an illustrative example of "state" information which may be added to the body content portion of a standard electronic Internet access packet by the first Web site accessed by the user during an Internet session; and FIG. 14 is an illustrative example of "enhanced state" information which may be added to the body content portion of an electronic Internet access packet by another Web site accessed by the user during an Internet session.

DETAILED DESCRIPTION OF THE PREFERRED EMBODIMENT

Figure 1:
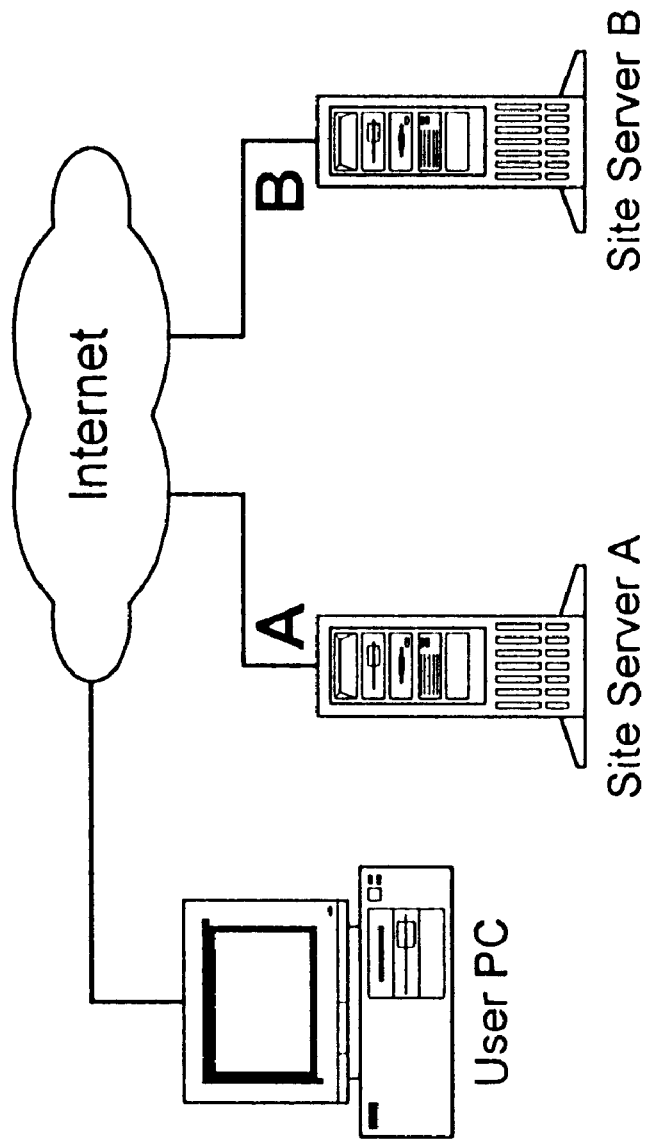
FIG. 1 is an schematic illustration of a conventional Internet system, showing the user's PC ("personal computer") in communication with any one of a multitude of Web site servers via the Internet.
Figure 5:
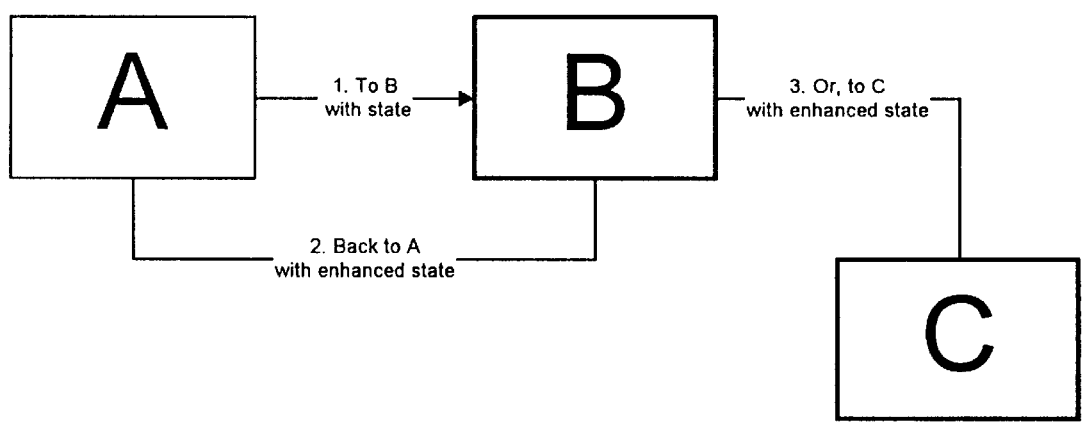
FIG. 5 is a schematic illustration showing how a user may interact with a base Web site and several Web sitelets in accordance with the present invention.

As discussed above, the present invention provides a novel system and method for communicating between a group of related Web sites. More particularly, the novel system and method allow the user to sequentially interact with selected ones of the related Web sites in such a manner that each successively accessed Web site is provided with user-specific information regarding the user's prior interaction with any of the related Web sites during a given Internet session. FIGS. 3–5 illustrate the basic architecture of the new Internet system. FIGS. 6–15, on the other hand, provide an illustration of the system and its method of operation in the context of an exemplary "shopping basket" system for buying food.

The basic system architecture, illustratively shown in FIG. 3, comprises a user PC and a group of related Web sites, all connected to the Internet in the conventional manner. The group of Web sites includes a base Web site ("Net POS Server A") and various related Web sites (or "Sitelets") representatively shown as "Sitelet POS Server B". The sitelets contain information related to, and permissably expanding upon, the subject matter of the basic Web site.

As generally indicated in FIG. 3, the user connects to base Web site A via a conventional Internet access packet as discussed above with reference to FIG. 2. While connected to site A, the user interacts with site A and thereby establishes "state". As used herein, the term "state" is intended to mean information such as the user's identity, the user's password, and other information relating to the user's interaction with base site A.

At some point during the user's interaction with base site A, the user may be directed to go to sitelet B by a hypertext link or otherwise. At this point, site A returns information to the user's PC in the form of a standard Internet access packet as shown in FIG. 2, modified to include in it's body content the state information acquired by the user at site A (see FIG. 4).

The user's PC then contacts sitelet B using the modified Internet access packet. The modified Internet access packet tells sitelet B that the user is coming from site A and that the user is looking for certain information from sitelet B.

While connected to sitelet B, the user interacts with sitelet B and then is directed either to a further sitelet in the group (for example, sitelet C) or back to site A (see FIG. 5). In either case, the access packet transferred back to the user's PC by sitelet B, and thereafter used to contact the next Web site contacted by the user following sitelet B, includes further body content indicative of the activity of the user at sitelet B, e.g. the "enhanced state" information.

Upon the user's return to a previously visited site in the group, for example, base site A, the enhanced state information contained in the access packet of FIG. 4 updates the basic state information which would normally be used by the user's PC and site A to set site A in the condition which it was in when the user initially left that site.

The system and method of the present invention will now be discussed in the context of the so-called "shopping basket" example mentioned above. More particularly, FIGS. 6–15 will be utilized to representatively demonstrate the system and method of the present invention in the context of on-line food purchasing. This example is currently in commercial use and may be accessed on the Internet at the URL address http://www.food-online.com.

Figure 6:
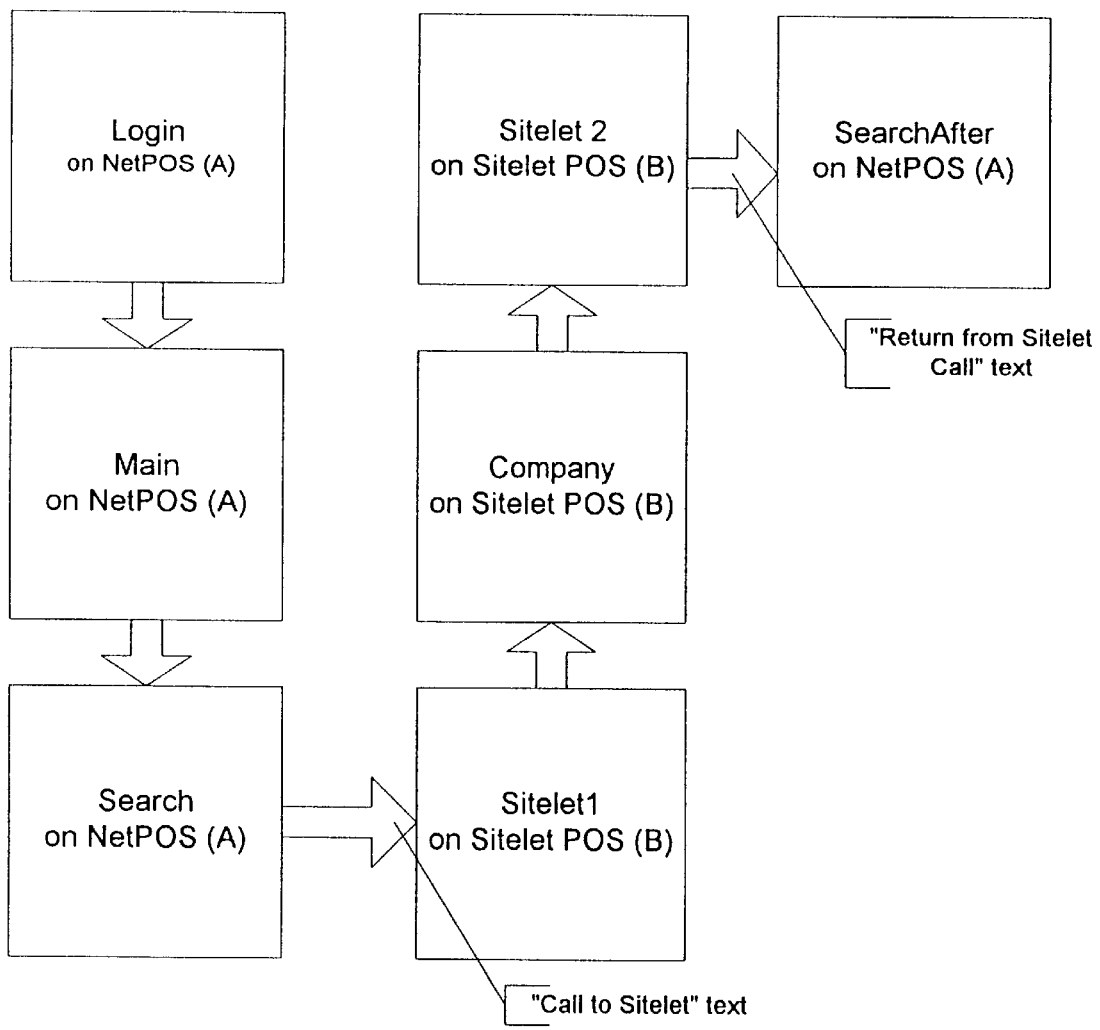
FIG. 6 is a schematic illustration showing the operation of an exemplary embodiment of the present invention.

Referring now to FIG. 6, there is shown an illustrative flow chart of an exemplary embodiment system of the present invention and its operation. More specifically, the operation of this exemplary embodiment includes the following steps:

(a) The user connects to base Web site A, identifies itself and provides its password. This information is stored by Web site A for incorporation into the standard electronic Internet access packet as "state" information which is returned to the user's PC upon the user leaving site A.

(b) The user proceeds to the main index screen of the base Web site A where the user selects an option from those presented. The available options may take the user to another page of the base Web site A or may direct the user to a Web sitelet either via a hypertext link or otherwise.

(c) For purposes of this example, it will be assumed that the user selects the search option from the main Web page of base site A.

(d) The user is transferred to the search option page of base Web site A.

(e) For purposes of this example, it is assumed that the user selects the "product" option from the search page of base Web site A.

(f) The user is provided with basic information regarding the product selected by the display of the specified page within base Web site A.

(g) The user desires more information about the product selected.

(h) The user is directed to a related Web page on sitelet B containing the desired information. Sitelet B may be located either on same server as base site A or on a different server. As mentioned above, the latter configuration provides the benefit that the manufacturer of the product of interest can be made responsible for maintaining its own information current and accurate, thereby removing a significant burden from the operator of base site A and assuring customer satisfaction to the greatest extent possible.

(i) Site A transfers a modified Internet access packet, containing "state" information in its body content, back the user's PC, and the user's PC then contacts sitelet B using the modified Internet access packet.

(j) Sitelet B utilizes the state information in the modified Internet access packet to ascertain why the user is there, and provides the desired information page on that sitelet directly to the user's PC.

(k) The user is then free to navigate around, and to interact with, sitelet B so as to acquire additional information. For example, the user might desire to obtain further information about the company which makes the product which the user originally inquired about at site A, and/or about other products made by that company.

(l) The user then leaves sitelet B. When the user does so, an Internet access packet containing the enhanced state information from sitelet B is returned to the user's PC, and an access packet containing both the state and the enhanced state information is used to direct the user either back to the base Web site A or on to another sitelet C (see FIG. 5).

(m) At this point, the user re-enters base site A or enters sitelet C with an Internet access packet containing both state information and enhanced state information, i.e., information regarding the user's interactions with site A and sitelet B. Assuming that the user returns to site A, the enhanced access packet updates the user's status in site A according to both the user's prior interaction with site A and the user's prior interaction with sitelet B.

A specific example of the various screen displays which may be provided to the user by the system during an Internet session, and the nature of the body content added to a standard Internet access packet to indicate "state" and "enhanced state", will facilitate an understanding of the foregoing by those skilled in the art.

Figure 7:
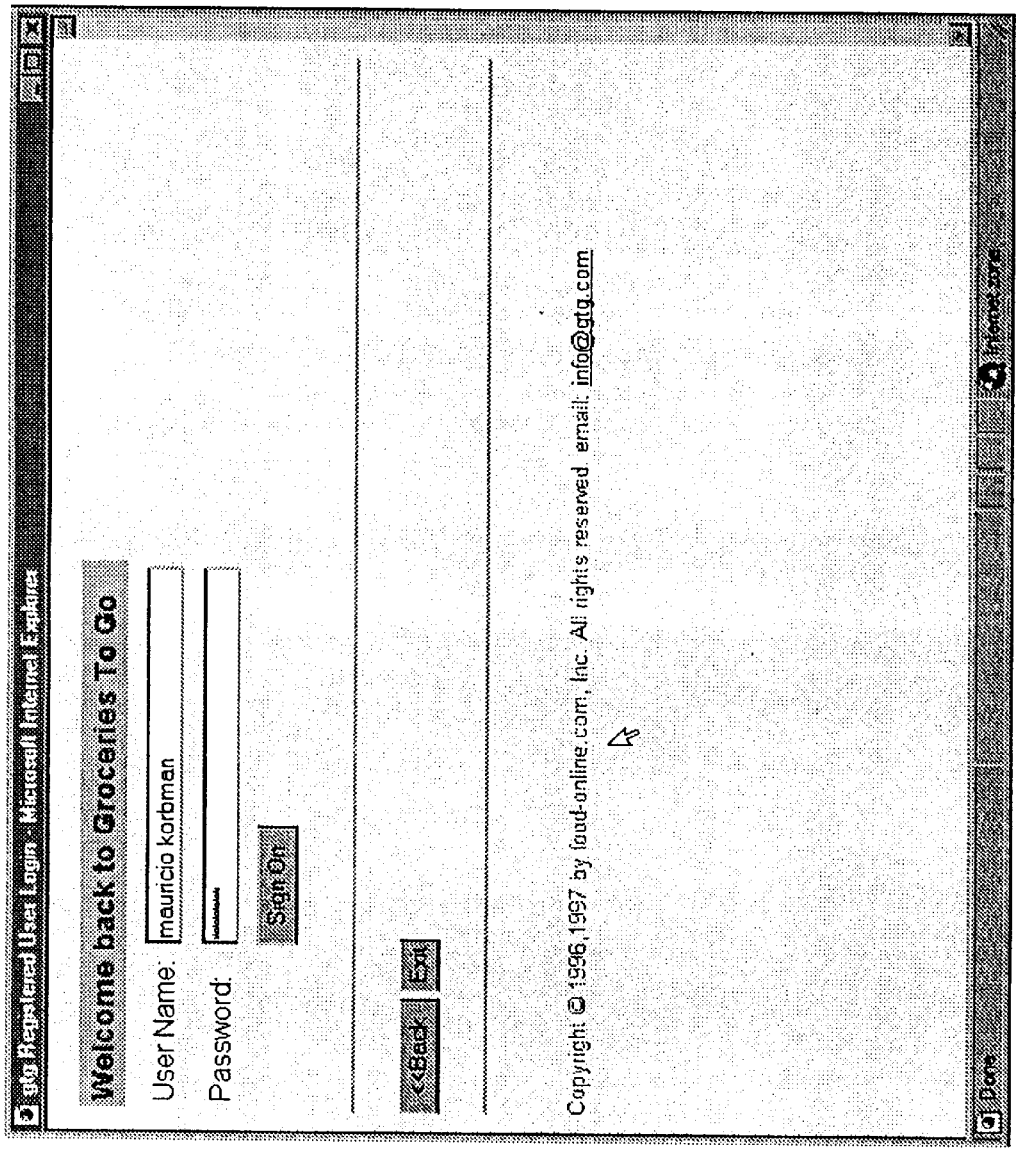

Referring first to FIG. 7, a representative login screen is shown wherein the user may be required to enter such information as that user's name and password for a particular service. This corresponds to the "Login on NetPos(A)" block of FIG. 6.

Figure 8:
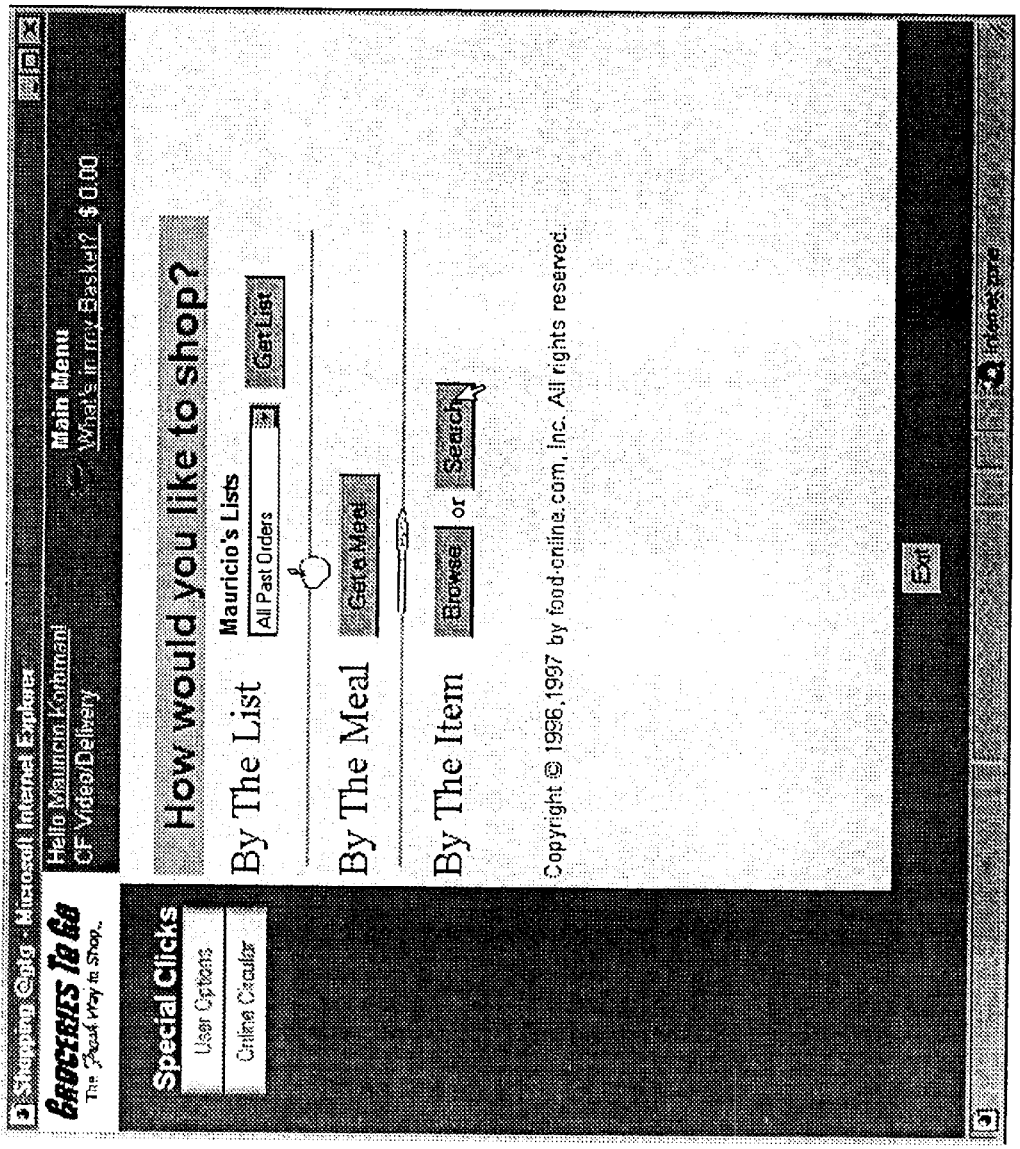

FIG. 8 shows a main menu screen corresponding to the "Main on NetPos(A)" block of FIG. 6. From this screen the user may select how the user wishes to interact with Web site A in a conventional manner. For example, the user may wish to proceed by reference to prior lists of goods purchased, by pre-selected meal components, or by browsing or searching through an index of available items. For the sake of this example, the search option has been selected (see arrow in FIG. 8).

Figure 9:
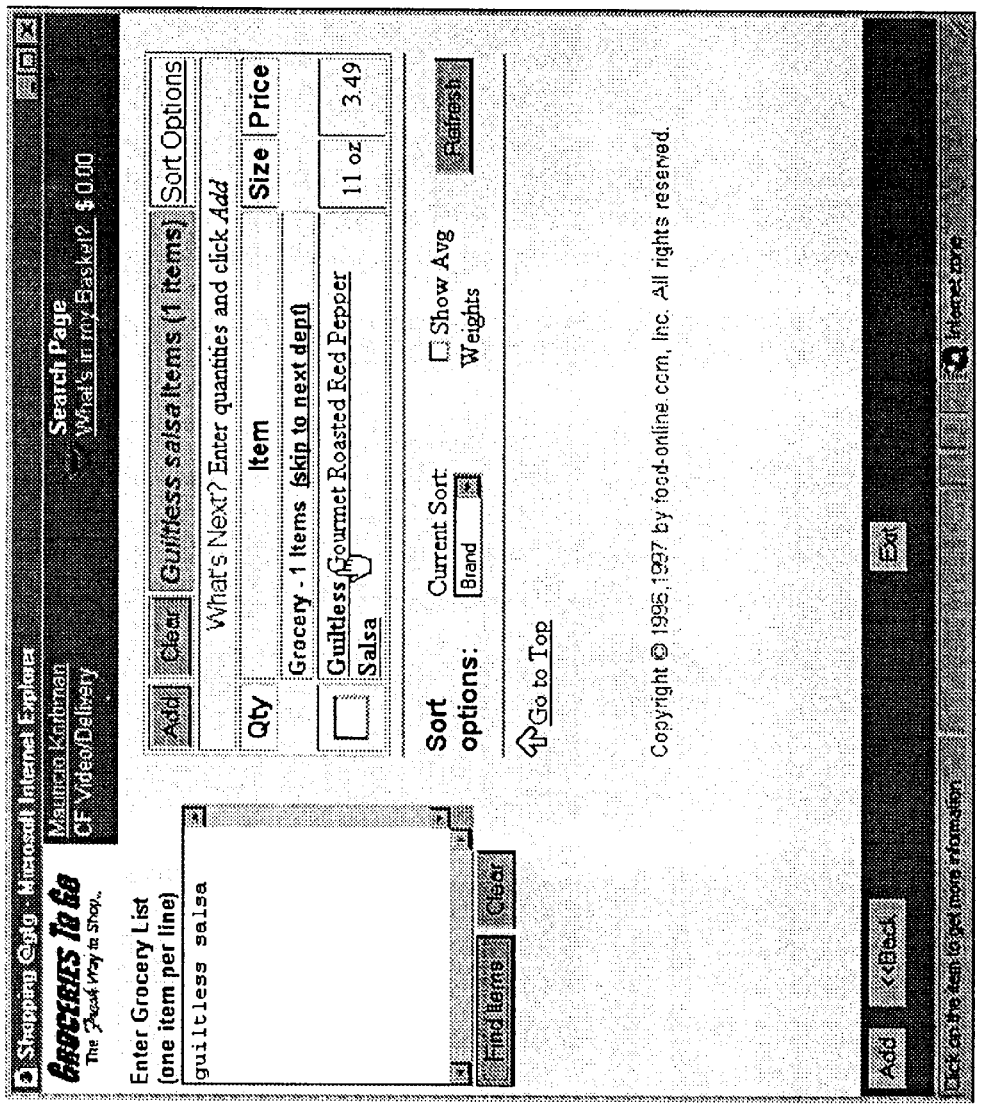

FIG. 9 shows a representative search screen for Web site A which corresponds to the "Search on NetPos(A)" block of FIG. 6. The search screen includes various representative options for user interaction with Web site A. As was the case with the screen displays shown in FIGS. 7 and 8 (and as will be the case for other screen displays shown subsequently herein), the specific nature of these options will be readily understood by those skilled in the art and are not necessary to a complete understanding of the present invention. Accordingly, only selected ones of the available options will be discussed herein.

On the search page of site A, the user can enter an identification of a product of interest, and site A will provide all information available on that site regarding that product to the user—here, the size of the product and its price per unit. Assuming, however, that the user desires further information regarding the product in question, the user can obtain the same via a hypertext link (see finger pointing to "Guiltless Gourmet Roasted Red Pepper Salsa").

Figure 11:
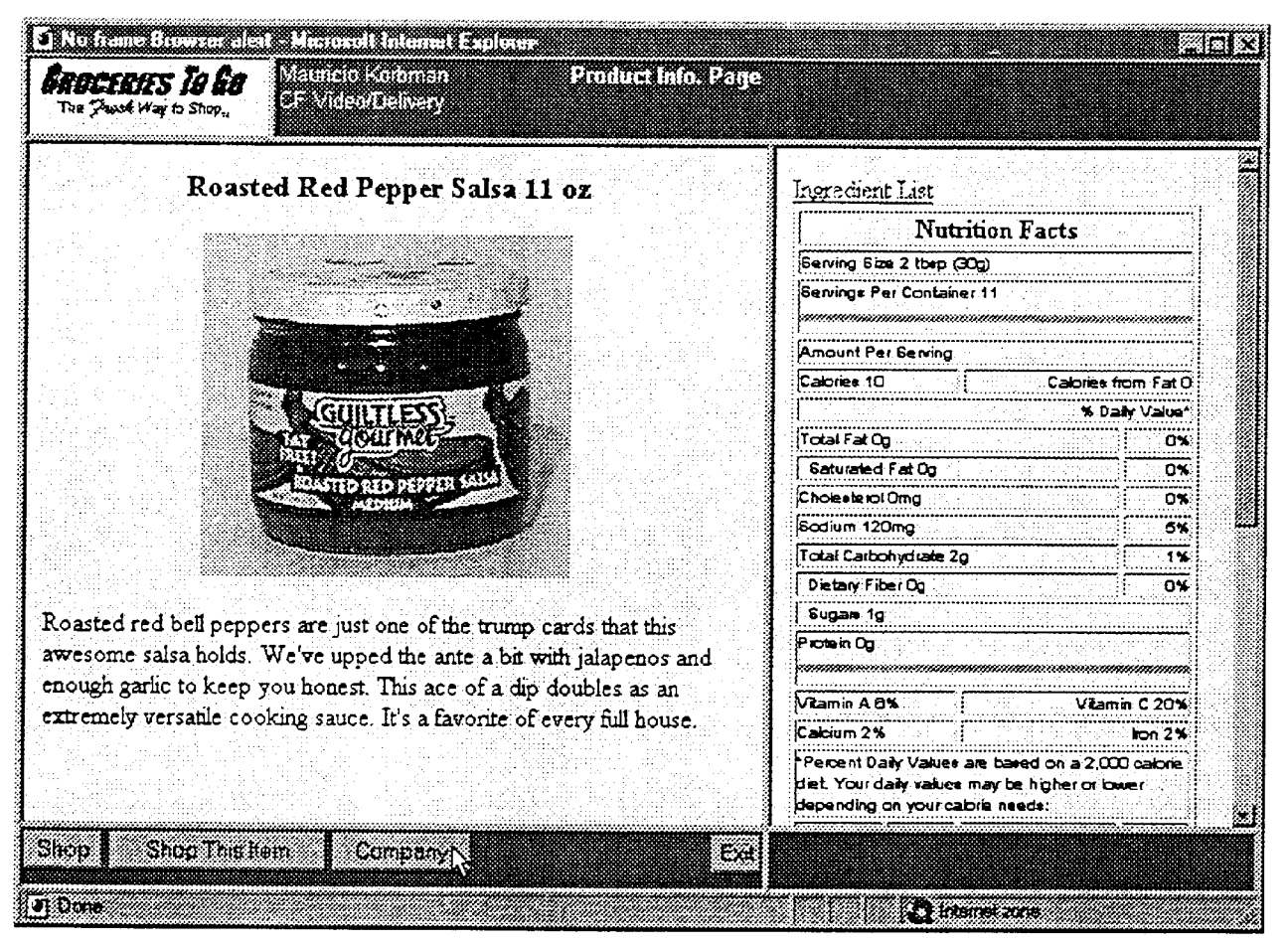

The hypertext link on the search page of site A directs the user's computer to the relevant page of sitelet B on Sitelet POS (B). Sitelet B is located at a different Web site than Web site A. Sitelet B is related to site A such that the display format may be the same for both sites. Sitelet B is also related to site A in the sense that it contains the information requested by the user. A modified electronic Internet access packet, containing state information from site A (see FIG. 10) is sent to the user's PC, and then is used by the user's PC to access sitelet B with state. This state information from site A causes sitelet B to open directly onto the Web page of sitelet B which is of interest to the user, with the display format configured so as to be consistent with the display format of site A. FIG. 11 shows a representative screen of sitelet B acquired by the user via the hypertext link shown in FIG. 9.

The Web page viewed by the user at sitelet B also includes standard options for navigating sitelet B. Thus, the user can move from the opening page called for by the state information in the body portion of the modified access packet to other pages of sitelet B which may be of interest to the user (see arrow in FIG. 11 which opens the "Company" page of Web sitelet B, as shown in FIG. 12).

Figure 12:
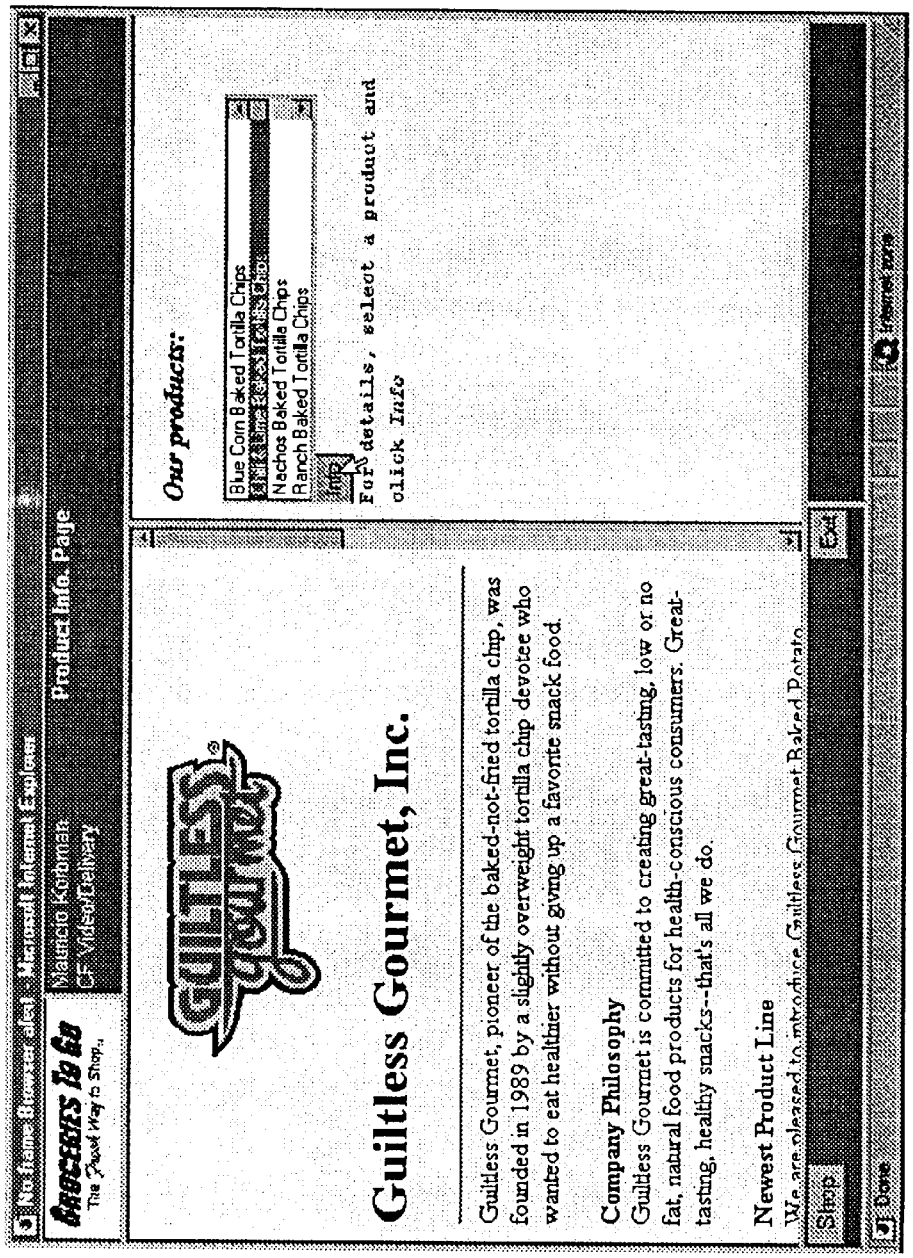

FIG. 12 is also illustrative of the fact that the user can further navigate sitelet B in the conventional manner to review other information of interest or to otherwise interact with sitelet B. For example, the highlighting of a particular type of tortilla chip in the right-hand panel of FIG. 12, and the arrow pointing to the "Info" button, are indicative of the specification of another page of sitelet B and a user interaction with sitelet B. Hence, activation of the "Info" button takes the user to the detail screen for the highlighted chips (see FIG. 13 and the blocks "Company on Sitelet POS (B)" and "Sitelet 2 on Sitelet POS (B)" of FIG. 6).

Figure 13:
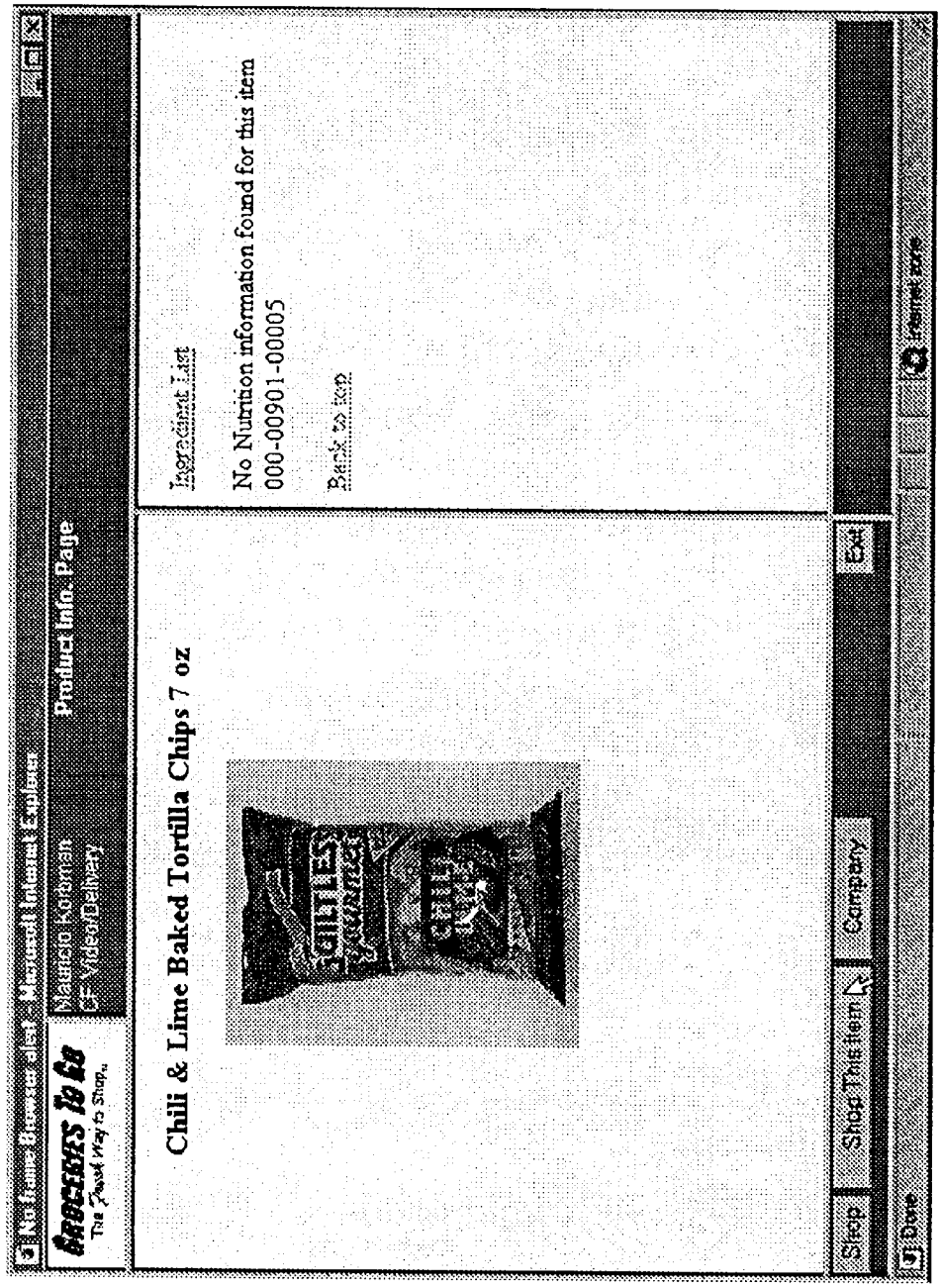

At the bottom of the screen shown in FIG. 13 is a so-called "hot button" labeled "shop this item". This hot button acts as a hypertext link back to the related Web site A (see "SearchAfter on NetPOS (A)" block of FIG. 6).

Figure 15:
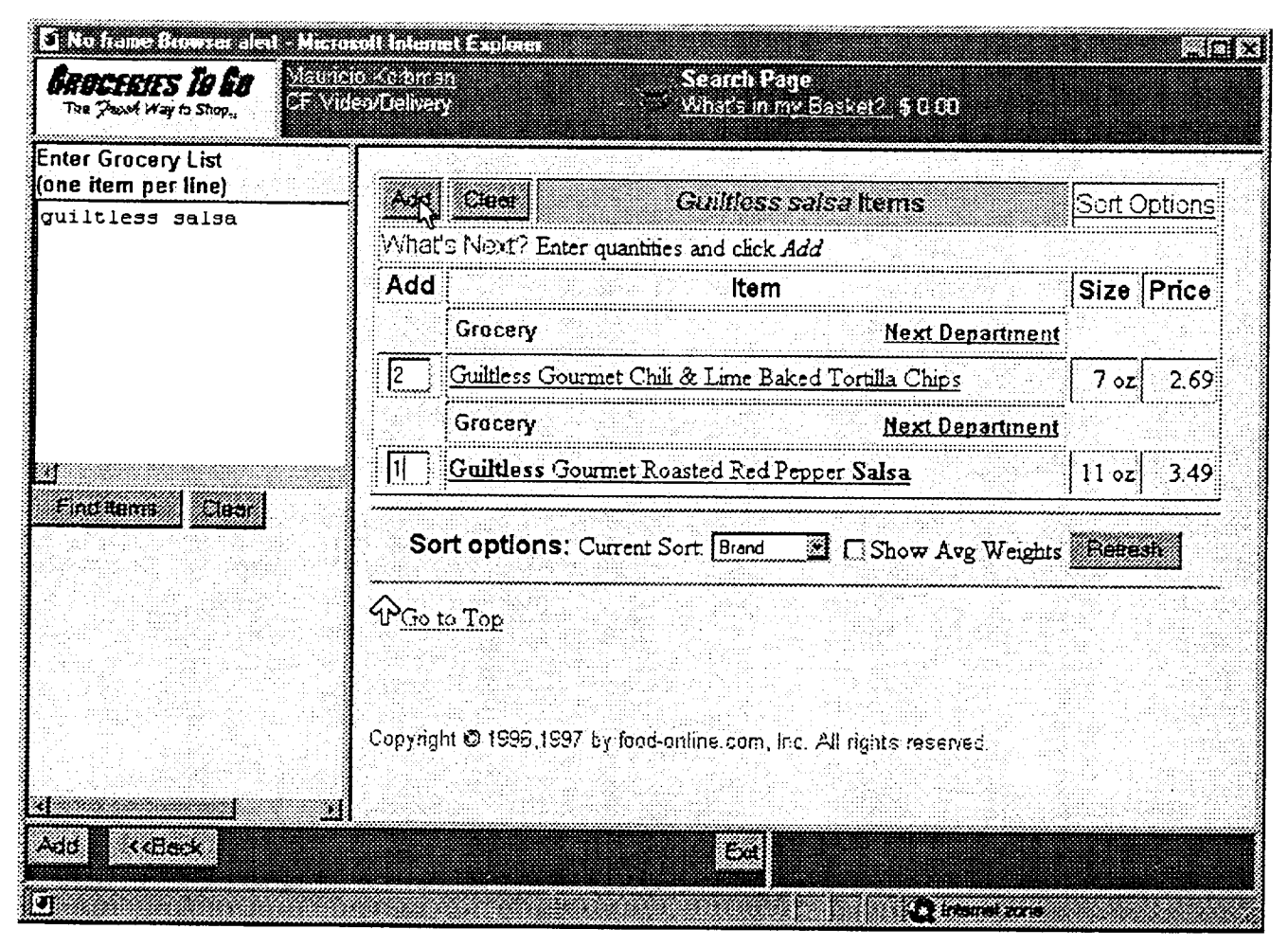

The Internet access packet which this hypertext link causes to be transmitted back to the user's PC is shown in exemplary form in FIG. 14. At this point, the user PC, site A and sitelet B all may be considered to have the same state. The enhanced state information shown in FIG. 14 is added to the modified Internet access packet at the user's PC and that enhanced packet is issued by the user's PC to re-connect the user's PC to site A. Thus, as indicated in FIG. 15, site A returns the user to the search page from which the user left to go to sitelet B, but now including both the salsa and the chips in the listing of the items which may be ordered, rather than the salsa alone. More particularly, the enhanced state information from sitelet B has been used to modify the search page of Web site A such that it reflects the additional product which was designated by the user on sitelet B.

The user is then allowed to further interact with Web site A to order the products shown on the search page which the user has researched, and also to proceed further with its shopping, stopping as desired to research other products in the manner discussed above.

As indicated above, the foregoing description of an exemplary embodiment is intended to be illustrative only, and in no way limiting of the invention in its broadest aspects.

Thus, it will be understood by those skilled in the art that the system and method of operation of the present invention will find numerous uses beyond the so-called "shopping basket" context discussed above.

For example, in the field of education, a group of related Web sites could be created wherein lesson material for an entire course might be contained on various pages of a base Web site; standardized tests could be contained on a related sitelet; advanced tests could be contained on another sitelet; remedial instruction could be contained on yet another sitelet; extra credit material could be contained on yet another sitelet; and so on. The resulting system could be set up to operate such that after each chapter or lesson information on the base site, the user would be sent to a distinct sitelet for testing. The state information from the first site could be used to determine which test page was presented to the student. Then, depending upon the test results, the enhanced state information added to the body content of the access packet could be used to determine whether or not the student could move forward in Web site A, be redirected by the system to remedial site C, be given advanced subject matter at Web site D, etc.

Similarly, in fields such as engineering and/or architecture, a basic interactive site could be provided within which a project could be developed. Related sitelets could also be created which would provide the user with details concerning the strength and characteristics of various materials and other variables which might have to be researched during the course of a given project. The addition of state and enhanced state information to the electronic Internet access packets in such situations would create great efficiencies of time for research and the like. At the same time, significant benefit would result to the owners of the related Web site group by virtue of the fact that the user would be prevented from straying outside of their control during the course of an activity, with the chance of the user failing to return to the Web site group thereafter. Obviously, such user straying outside of the related groups of Web sites creates a real and undesirable chance of loss of business to the companies involved.

Further variations, modifications, alterations and the like will occur to those skilled in the art in view of the foregoing description of the present invention and an exemplary embodiment thereof. It is therefore to be understood that the foregoing disclosures and descriptions are illustrative only, and that the scope of the invention is intended to be limited only by the terms of the appended claims.

What is claimed is:

1. An Internet system comprising:

a user computer connected to the Internet;

a group of related, information-containing Internet sites; and means for permitting said user computer to sequentially interact with selected ones of said group of Internet sites such that each of said selected ones of said Internet sites is provided with user-specific information regarding the user computer's prior interactions with Internet sites contained within said group during any discrete Internet session, wherein said user computer is adapted (a) to access at least one of said Internet sites in said group with a standard electronic Internet access packet, said standard packet containing a header portion and a body portion; and (b) to subsequently navigate among the Internet sites of said group with electronic Internet access packets containing body portions which have been modified so as to contain state information regarding the user computer's previous interactions with one or more other Internet sites in said group during a discrete Internet session.

2. An Internet system according to claim 1 wherein said group of Internet sites comprises a base Internet site and a plurality of Internet sitelets.

3. An Internet system according to claim 2 wherein each of said Internet sitelets contains information directly related to, and permissibly expanding upon, the subject matter contained in said base Internet site.

4. An Internet system according to claim 2 wherein at least one of said sitelets contains information directly related to the subject matter of the information contained within said base site.

5. An Internet system according to claim 4 wherein at least some of said sitelets contain information directly related to the subject matter of the information contained in other of said sitelets, whereby said user computer may be directed from said base site sequentially to a first sitelet directly related to said base site, and thence from said first sitelet to a second sitelet directly related to said first sitelet.

6. A method for communication via the Internet, said method comprising the steps of:

(a) providing an Internet system comprising:
   a user computer connected to the Internet;
   a group of related, information-containing Internet sites; and
   means for permitting said user computer to sequentially interact with selected ones of said group of Internet sites such that each of said selected ones of said Internet sites is provided with user-specific information regarding the user computer's prior interactions with Internet sites contained within said group during any discrete Internet session;

(b) accessing one of said group of Internet sites from said user computer with a standard electronic Internet access packet including a header portion and a body portion;

(c) interacting via said user computer with said one of said group of Internet sites;

(d) navigating from said one of said group of Internet sites to another of said group of Internet sites via said user computer with an electronic Internet access packet including state information regarding said user computer's interaction with said one of said Internet sites;

(e) navigating from said another of said group of said Internet sites to a further one of said Internet sites with an electronic Internet access packet including said state information and enhanced state information representative of said user computer's interaction with said another of said group of Internet sites; and (f) repeating step (e) as many times as desired during a discrete Internet session such that as each Internet site is accessed by said user computer, each such accessed site utilizes the state information contained in the electronic Internet access packet presented to it by said user computer to format, configure and select the information contained therein for transfer to said user computer.

7. A method according to claim 6 wherein said user computer accesses a base Internet site using a standard electronic Internet access packet; said user computer thereafter sequentially navigates among selected ones of said group of Internet sites utilizing electronic Internet access packets containing state and enhanced state information; and said user computer periodically re-establishes communication with said base Internet site.

\* \* \* \* \*